United States Patent [19]
Hattori

[11] Patent Number: 5,398,058
[45] Date of Patent: Mar. 14, 1995

[54] COLOR IMAGE PICKUP DEVICE HAVING COLOR TEMPERATURE CONVERTING FILTERS

[75] Inventor: Yuichiro Hattori, Yokohama, Japan

[73] Assignee: Canon Kabushiki Kaisha, Tokyo, Japan

[21] Appl. No.: 911,883

[22] Filed: Jul. 10, 1992

[30] Foreign Application Priority Data

Jul. 15, 1991 [JP] Japan .................. 3-173895

[51] Int. Cl.⁶ .............. H04N 9/73; H04N 9/04
[52] U.S. Cl. ................... 348/224; 348/228; 348/265; 348/270; 348/277
[58] Field of Search .......... 358/29 C, 41, 42, 43, 358/44, 50; H04N 9/73 OL, 9/04; 348/348, 224, 223, 228, 265, 270, 271, 276, 277, 279, 280

[56] References Cited

U.S. PATENT DOCUMENTS

| | | | |
|---|---|---|---|
| 4,355,325 | 10/1982 | Nakamura et al. | 358/29 |
| 4,851,899 | 7/1989 | Yoshida | 358/42 |
| 5,016,091 | 5/1991 | Choi | 358/29 |
| 5,046,162 | 9/1991 | Ishikawa | 358/42 |
| 5,053,871 | 10/1991 | Ogawa | 358/29 C |
| 5,155,585 | 10/1992 | Ishikawa | 358/42 |

FOREIGN PATENT DOCUMENTS

| | | |
|---|---|---|
| 0324107 | 7/1989 | European Pat. Off. . |
| 4106385A1 | 9/1991 | Germany . |
| 59-81992 | 5/1984 | Japan . |
| 59-100686 | 6/1984 | Japan . |
| 59-215189 | 12/1984 | Japan . |
| 60-230792 | 11/1985 | Japan . |
| 61-201590 | 9/1986 | Japan . |
| 2-272986 | 11/1990 | Japan . |

OTHER PUBLICATIONS

European Patent Office: Patent Abstracts of Japan, Publication #: JP59215189, Date: May 12, 1984.

*Primary Examiner*—James J. Groody
*Assistant Examiner*—Sherrie Hsia
*Attorney, Agent, or Firm*—Morgan & Finnegan

[57] ABSTRACT

A filter member which can alternatively arrange a proper one of a plurality of kinds of color temperature converting filters onto an optical axis of an image pickup device is provided and the driver of the filter member is controlled by using a plurality of color signals which are generated from the image pickup device, so that a proper color temperature converting filter can always be used. An adjusting mechanism for adjusting relative gains of a plurality of color signals which are generated from the image pickup device is further provided. By also adjusting the adjusting mechanism by using a plurality of color signals which are generated from the image pickup device, an automatic white balance control in a wide color temperature range can be accomplished.

9 Claims, 4 Drawing Sheets

COLOR IMAGE PICKUP DEVICE HAVING COLOR TEMPERATURE CONVERTING FILTERS

BACKGROUND OF THE INVENTION

1. Field of the Invention

The invention relates to a color image pickup device, and, more particularly, to a color image pickup device having color temperature converting filters.

2. Related Background Art

To correctly photograph the color of an object by a color video camera, it is necessary to correct spectral characteristics of an illuminating light source. FIG. 1 shows spectral radiating characteristics in the case where a color temperature of the light source is changed. An axis of abscissa indicates a wavelength of the light and an axis of ordinate indicates a relative value of a radiation energy. As will be understood from FIG. 1, the spectral characteristics of the light source largely change in dependence on the color temperature.

In the conventional color video camera of the three-color (RGB) separation type, there is used a circuit construction such that level differences among the channels of R, G and B are detected and gains of the respective channels are adjusted so as to eliminate the level differences among the channels in the achromatic color photographing operation. With this circuit, the spectral characteristics of the light source are corrected. Such an adjustment is called a white balance adjustment. A circuit to automatically execute the white balance adjustment is called an automatic white balance adjusting circuit and is well known.

FIG. 2 shows gain correction amounts of the R and B channels for the color temperature of the light source. An axis of abscissa indicates a color temperature of the light source and an axis of ordinate indicates a correction gain by a unit of dB. In the example, a temperature of 3200° K. is used as a reference.

However, in the conventional automatic white balance adjusting circuit, when it is intended to cope with illumination color temperatures of a wide range, a gain correction amount increases and a difference in S/N ratio, dynamic range, or the like occurs between the channels, so that such a method is unpreferable. On the other hand, there is a method of auxiliarily using a color filter (color temperature converting filter) to convert the color temperature of the light source. Three or four kinds of color temperature converting filters are prepared and a proper color filter is attached in accordance with the light source. FIG. 3 shows a change in gain correction amount depending on the color temperature when the color temperature converting filter is used. As will be understood from FIG. 3, the gain correction amount decreases.

As mentioned above, by auxiliarily using the color temperature converting filter, the gain correction amount in the automatic white balance adjusting circuit can be reduced. However, such a method is also limited to the case where the selected color temperature converting filter is proper to the light source. When the selected color temperature converting filter is improper to the light source, the gain correction amount in the automatic white balance adjusting circuit doesn't decrease and an advantage of the color temperature converting filter is not derived.

SUMMARY OF THE INVENTION

It is an object of the invention to solve the problems as mentioned above.

Another object of the invention is to provide a color image pickup device which can automatically adjust a white balance and can cope with color temperatures of a light source of a wide range without deteriorating an A/N ratio or a dynamic range of an image pickup signal.

Under the above objects, according to the invention, as one embodiment, there is provided a color image pickup device comprising: (a) image pickup means; (b) a filter member having a plurality of kinds of color temperature converting filters which can alternatively arranged on an optical axis of the image pickup means; (c) adjusting means for adjusting relative gains of a plurality of color signals which are generated from the image pickup means; (d) driving means for driving the filter member to switch the color temperature converting filter which is arranged on the optical axis; and (e) control means for controlling the adjusting means and the driving means by using the plurality of color signals.

The above and other objects and features of the present invention will become apparent from the following detailed description and the appended claims with reference to the accompanying drawings.

DETAILED DESCRIPTION OF THE PREFERRED EMBODIMENT

An embodiment of the invention will be described hereinbelow with reference to the drawings.

Figure 4:
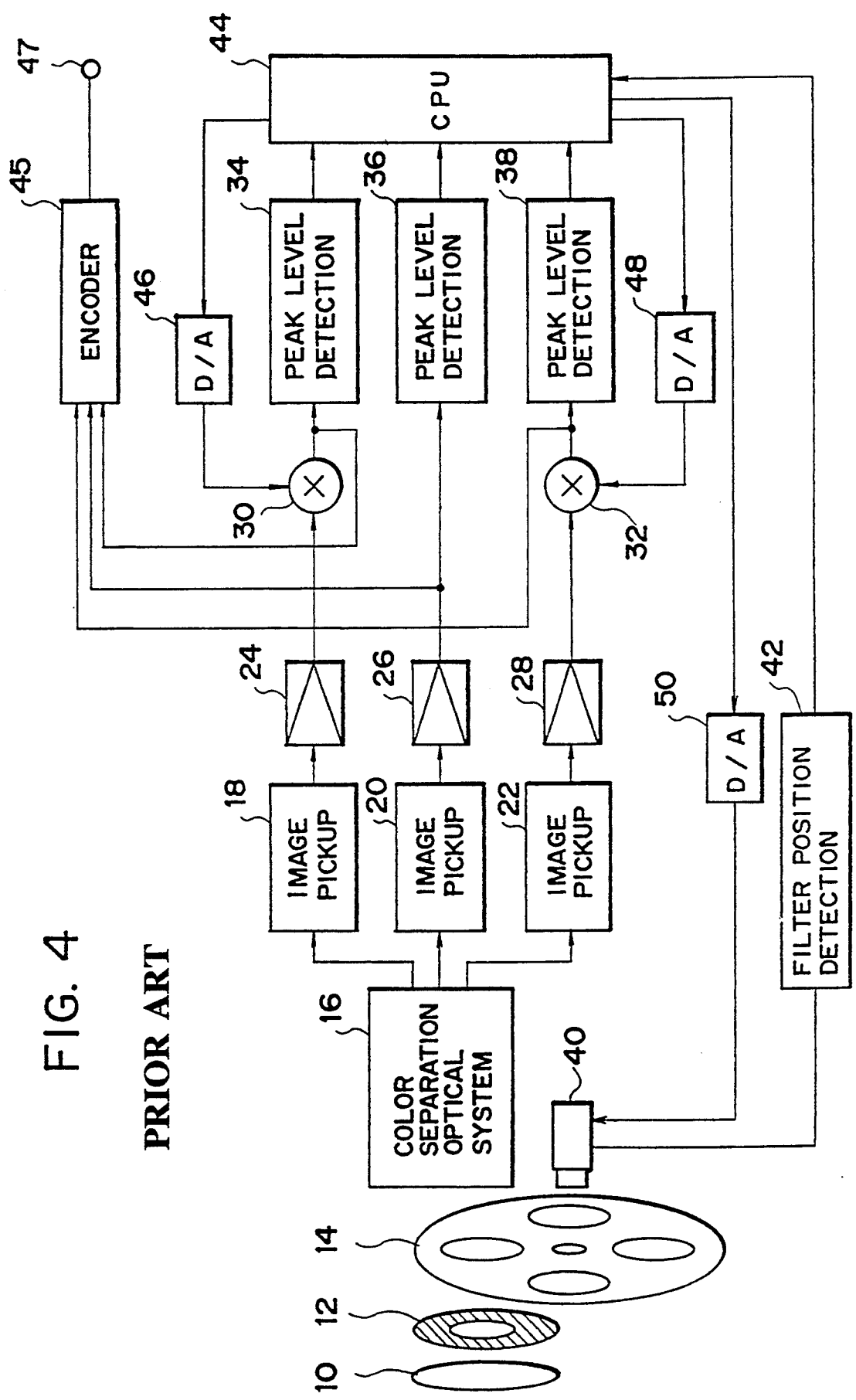
FIG. 4 is a block diagram showing a construction of a color image pickup device according to an embodiment of the invention.

FIG. 4 is a block diagram showing a construction of a main section including a white balance adjusting circuit in a color image pickup device according to an embodiment of the invention. Reference numeral 10 denotes a photographing lens; 12 a diaphragm; 14 a filter-disk having four kinds of color temperature converting filters (however, one of them corresponds to the case of using no filter); 16 a color separation optical system to separate an incident light into lights of three colors; 18, 20 and 22 image pickup devices each for converting an optical image into an electric signal; 24, 26 and 28 amplifiers to amplify outputs of the image pickup devices 18, 20 and 22 at predetermined gains; 30 and 32 multipliers for multiplying designated coefficients, which will be explained hereinlater, to outputs of the amplifiers 24 and 28; and 34, 36 and 38 peak level detection circuits to detect the peak levels of the output signals of the multiplier 30, amplifier 26, and multiplier 132, respectively.

Reference numeral 40 denotes a disk driving circuit for rotating the filter-disk 14, thereby positioning a desired color temperature converting filter onto the optical axis of the photographing lens 10, diaphragm 12, and color separation optical system 16. Reference numeral 42 denotes a filter position detection circuit to detect the rotating position of the filter-disk 14.

Reference numeral 44 denotes a CPU comprising a microcomputer for controlling gains of the R and B channels and for selecting a proper one of the color temperature converting filters of the filter-disk 14. Reference numeral 46 denotes a D/A converter for converting a gain control digital signal of the R channel which is generated from the CPU 44 into an analog signal and for supplying to the multiplier 30; 48 a D/A converter for converting a gain control digital signal of the B channel which is generated from the CPU 44 into an analog signal and for supplying to the multiplier 32; and 50 a D/A converter for converting the filter selection digital signal which is generated from the CPU 44 into an analog signal and for supplying to the disk driving circuit 40.

The fundamental operation of the white balance adjustment will be first briefly explained. An object image photographed through the photographing lens 10 enters the color separation optical system 16 through the diaphragm 12 and filter-disk 14 and is separated to images of respective colors and the color images enter the image pickup devices 18, 20 and 22. The image pickup devices 18, 20 and 22 generate image signals of R (red), G (green) and B (blue) of the object image, respectively. The amplifiers 24, 26 and 28 amplify the outputs of the image pickup devices 18, 20 and 22 by only predetermined gains, respectively. The multipliers 30 and 32 multiply coefficients which are applied from the CPU 44 through the D/A converters 46 and 48 to outputs of the amplifiers 24 and 28, respectively. That is, the multipliers 30 and 32 function as variable gain amplifiers.

The peak level detection circuits 34 and 38 detect the peak levels in one picture plane of output signals of the multipliers 30 and 32, respectively. The peak level detection circuit 36 detects the peak level in one picture plane of an output signal of the amplifier 26. That is, the peak level detection circuits 34, 36 and 38 respectively detect the peak levels of the R, G and B signals and supply the digital values to the CPU 44.

The CPU 44 determines gain correction amounts of the R and B channels by using the peak level (namely, the output of the peak level detection circuit 36) of the G channel as a reference. The gains are corrected by the D/A converters 46 and 48 and the multipliers 30 and 32.

A characteristic operation of the automatic white balance adjustment of the embodiment will now be described. First, multipliers of the multipliers 30 and 32 are set to the initial values and the case of no-filter is selected as a color temperature converting filter of the filter-disk 14. The CPU 44 obtains the color temperature information from the outputs of the peak level detection circuits 34, 36 and 38 in the above state and selects the proper color temperature converting filter in accordance with the color temperature information. Since a fluctuation of the signal level due to the change of the color temperature converting filter can be presumed, the color temperature converting filter can be easily selected.

The CPU 44 can know which one of the color temperature converting filters of the filter-disk 14 is located on the optical axis on the basis of an output signal of the filter position detection circuit 40. Therefore, the CPU 44 controls the disk driving circuit 40 through the D/A converter 50, thereby allowing the selected color temperature converting filter to be located on the photographing optical axis.

When the selected color temperature converting filter is located on the photographing optical axis, the multipliers of the multipliers 30 and 32 are determined so as to equalize the peak levels of the R, G and B channels. For instance, when it is now assumed that the peak levels of R, G and B at the time point of the start of the white balance adjustment are equal to

R: 0.48 V
G: 0.7 V
B: 1.23 V the correction amounts are equal to

R: 3.3 dB
B: −4.9 dB

Figure 1:
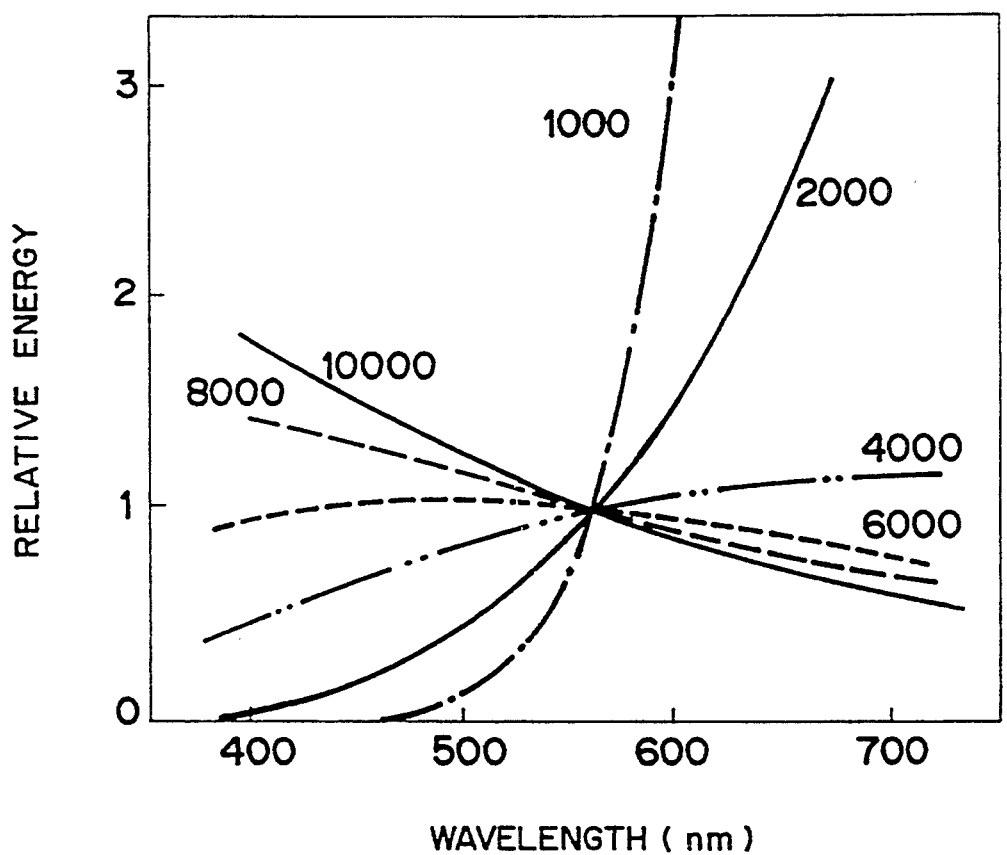
FIG. 1 is a diagram showing the relation between the color temperature and the spectral characteristics.
Figure 2:
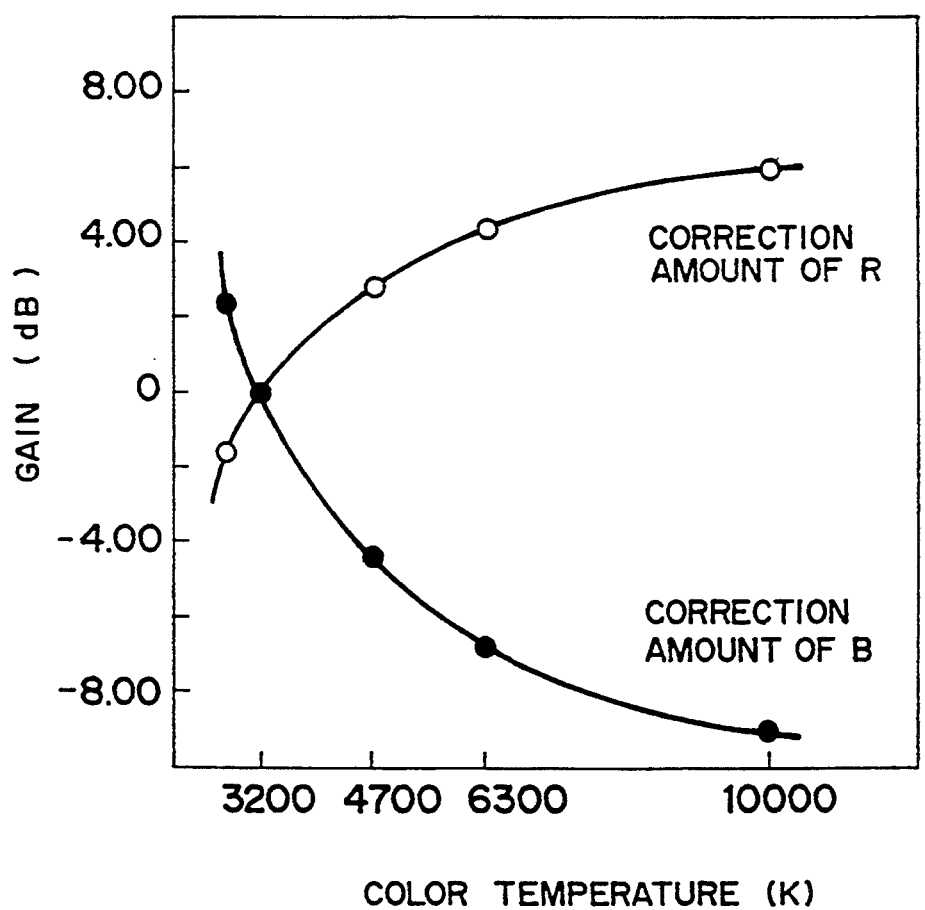
FIG. 2 is a diagram showing the relation between the color temperature and the gain correction amount in the white balance adjusting operation.
Figure 3:
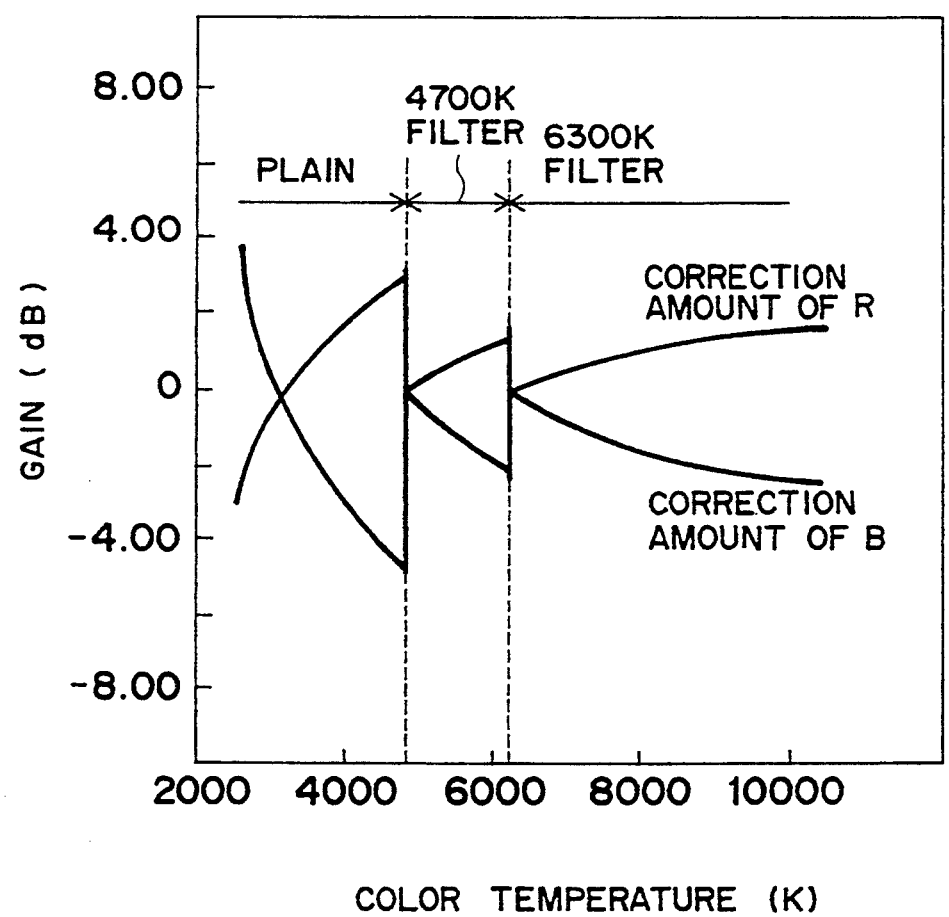
FIG. 3 is a diagram showing the relation between the color temperature and the gain correction amount in the case of effectively using a color temperature filter.

Since it is considered from FIG. 2 that the color temperature of the light source is close to 5000° K., for example, it is sufficient to select the filter corresponding to 4700° K. as a color temperature converting filter. Due to this, as will be also understood from FIG. 3, the gain correction amount is equal to about +1 dB.

According to the embodiment, the proper white balance adjustment can be easily performed in a short time even due to a change in photographing condition. As mentioned above, the white balance adjusted R, G and B signals are supplied to an encoder 45, so that a color video signal is formed by the encoder 45. The color video signal formed by the encoder 45 is supplied from an output terminal 47 to an external apparatus such as a VTR or the like.

Although the three-plate type has been explained as an example, the invention can be also obviously applied to other color image pickup devices of the single plate type and the like. The invention can be also obviously applied to not only a motion camera but also a still camera.

As will be easily understood from the above description, according to the invention, since a proper color temperature converting filter can be always used, it is possible to cope with color temperatures of the light source of a wide range without deteriorating the S/N ratio and the dynamic range. Moreover, since the overall adjustment itself of the white balance can be automatically executed, the operating efficiency is also extremely improved.

What is claimed is:

1. A color image pickup device comprising:
   (a) image pickup means;
   (b) a filter member having a plurality of kinds of color temperature converting filters which can be alternatively arranged on an optical axis of said image pickup means;
   (c) adjusting means for adjusting relative gains of a plurality of color signals which are generated from said image pickup means;
   (d) driving means for driving said filter member to switch a color temperature converting filter arranged on the optical axis; and
   (e) control means for controlling said adjusting means and said driving means on the basis of signals which are picked up by said image pickup means when a color temperature converting filter which corresponds to no filter is arranged on the optical axis.

2. A device according to claim 1, wherein said control means forms color temperature information by using said signals and controls said adjusting means and said driving means on the basis of said color temperature information.

3. A device according to claim 2, wherein said control means includes a peak detection circuit to detect a peak level in one picture plane in said plurality of color signals and forms said color temperature information in accordance with an output of said peak detection circuit.

4. A device according to claim 1, wherein said control means controls said driving means by using said signals and, thereafter, controls said adjusting means by using said signals.

5. A device according to claim 1, wherein said control means includes a microprocessor and said microprocessor fetches data regarding levels of said signals and generates digital information to control said driving means and digital information to control said adjusting means.

6. A device according to claim 1, wherein said adjusting means includes a plurality of multipliers to respectively multiply a plurality of coefficients from said control means to said plurality of color signals.

7. A device according to claim 6, wherein said control means includes a microprocessor and said microprocessor fetches data regarding levels of said signals and generates a plurality of digital information corresponding to said plurality of coefficients.

8. A device according to claim 1, wherein said image pickup means includes a color separation optical system to separate an object image on said optical axis to object images of a plurality of colors.

9. A color image pickup device comprising:
(a) image pickup means;
(b) a filter member having a plurality of kinds of color temperature converting filters which can be alternatively arranged on an optical axis of said image pickup means;
(c) driving means for driving said filter member to switch a color temperature converting filter arranged on the optical axis; and
(d) control means for controlling said driving means on the basis of signals which are picked up by said image pickup means when a color temperature converting filter which corresponds to no filter is arranged on the optical axis.

* * * * *

UNITED STATES PATENT AND TRADEMARK OFFICE
CERTIFICATE OF CORRECTION

PATENT NO. : 5,398,058
DATED : March 14, 1995
INVENTOR(S) : Yuichiro Hattori

It is certified that error appears in the above-indentified patent and that said Letters Patent is hereby corrected as shown below:

In Column 2, line 64, delete "132" and insert therefor --32--

In Column 4, line 21, delete "+" and insert therefor --$\pm$--

Signed and Sealed this

Seventeenth Day of October, 1995

Attest:

BRUCE LEHMAN

Attesting Officer   Commissioner of Patents and Trademarks